(12) United States Patent
Huang et al.

(10) Patent No.: US 11,369,099 B1
(45) Date of Patent: Jun. 28, 2022

(54) MAGNETIC BRAKING MECHANISM, BAITCAST REEL AND FISHING TOOL

(71) Applicant: Shenzhen Bosaidong Technology Co., Ltd., Guangdong (CN)

(72) Inventors: Liang Huang, Guangdong (CN); Hui Yin, Guangdong (CN)

(73) Assignee: Shenzhen Bosaidong Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/192,864

(22) Filed: Mar. 4, 2021

(30) Foreign Application Priority Data

Dec. 9, 2020 (CN) .......................... 202011448807.3

(51) Int. Cl.
*A01K 89/01* (2006.01)
*A01K 89/033* (2006.01)

(52) U.S. Cl.
CPC .......... *A01K 89/056* (2015.05); *A01K 89/051* (2015.05)

(58) Field of Classification Search
CPC ................ A01K 89/056; A01K 89/051; A01K 89/01555; A01K 89/01557; H02K 7/104
See application file for complete search history.

(56) References Cited

U.S. PATENT DOCUMENTS

| 5,692,693 | A | * | 12/1997 | Yamaguchi | ...... | A01K 89/01555 242/288 |
| 6,126,105 | A | * | 10/2000 | Yamaguchi | ...... | A01K 89/01555 188/164 |
| 2009/0026300 | A1 | * | 1/2009 | Tsutsumi | ......... | A01K 89/01555 242/288 |
| 2009/0127367 | A1 | * | 5/2009 | Tsutsumi | ......... | A01K 89/01555 242/286 |

* cited by examiner

*Primary Examiner* — Emmanuel M Marcelo

(57) ABSTRACT

The present disclosure disclosed a magnetic braking mechanism which includes a spool, a magnet assembly arranged on a side of the spool for generating magnetic induction lines, and a magnetic braking assembly connected to the spool and including at least two metal plates and a centrifugal adjusting assembly. The metal plates are disposed between the magnet assembly and the spool, and the centrifugal adjusting assembly is used for automatically adjusting spacing between the metal plates and an axis of the spool according to a rotation speed of the spool, so as to adjust range of the magnetic induction lines cut by the metal plates, thereby automatically adjusting magnitude of a braking force. Further disclosed are a baitcast reel and a fishing tool.

24 Claims, 5 Drawing Sheets

US 11,369,099 B1

MAGNETIC BRAKING MECHANISM, BAITCAST REEL AND FISHING TOOL

CROSS REFERENCE TO RELATED APPLICATION

The present application claims priority from Chinese patent application No. 202011448807.3 filed on Dec. 9, 2020, the entire content of which is incorporated herein by reference.

TECHNICAL FIELD

The present disclosure relates to the field of fishing tackle, and in particular to a magnetic braking mechanism, a baitcast reel and a fishing tool.

BACKGROUND TECHNOLOGY

Fishing reel is one of the necessary fishing tackle for fishing. The existing magnetic braking system of fishing reel can only apply a constant braking force during casting. Therefore, it is difficult to control the fishing reel when the rotation speed of the spool is too fast, thereby causing backlashes. Moreover, it is incapable of adjusting the braking force according to the rotation speed of the spool, so that a longer casting distance cannot be achieved.

SUMMARY

An objective of the present disclosure is to provide a magnetic braking mechanism, a baitcast reel and a fishing tool which can automatically adjust the braking force according to the speed of a spool.

In order to solve the above-mentioned technical problems, an aspect of the present disclosure provides a magnetic braking mechanism which includes:

a spool;

a magnet assembly arranged on a side of the spool for generating magnetic induction lines; and a magnetic braking assembly connected to the spool, and including at least two metal plates and a centrifugal adjusting assembly. The metal plates are disposed between the magnet assembly and the spool, and the centrifugal adjusting assembly is used for automatically adjusting spacing between the metal plates and an axis of the spool according to a rotation speed of the spool, so as to adjust range of the magnetic induction lines cut by the metal plates, thereby automatically adjusting magnitude of a braking force.

Further, the magnet assembly includes a magnet base arranged on the side of the spool and a magnetic body consisting of a plurality of magnets. The magnetic body is disposed on the magnet base, and magnetic poles on two facing sides of each two adjacent magnets are opposite.

Further, the magnet assembly includes a magnet base arranged on the side of the spool and a magnetic body consisting of a plurality of magnets. The magnetic body is disposed on the magnet base. Each of the magnets includes a first magnet and a second magnet arranged opposite to each other, and the first magnet and the second magnet have opposite magnetic poles.

Further, the centrifugal adjusting assembly includes a base body and at least two elastic pieces. The base body is connected to the spool. Each of the metal plates is movably arranged on the base body through one of the elastic pieces respectively, in order to move in a radial direction of the base body under a centrifugal force or an elastic force of the elastic pieces.

Further, at least two sliding slots are provided on the base body, and a stopper is provided in a middle part of each of the sliding slots. Two sliding blocks are extended downward respectively from two opposite ends of each of the metal plates, and the two sliding blocks are both disposed in one of the sliding slots and located respectively on two sides of the stopper. One end of each of the elastic pieces abuts against the stopper, and the other end abuts against one of the sliding blocks that is near the axis of the spool to drive the metal plates to move in the radial direction of the base body.

Further, the centrifugal adjusting assembly also includes a limiting block located between two adjacent metal plates, and the limiting block is arranged at an edge of the base body to limit a moving distance of the metal plates in the radial direction of the base body.

Further, the magnetic braking assembly includes four metal plates and elastic pieces, and the four metal plates and elastic pieces are arranged on the base body around the center of the base body.

Further, the magnetic braking mechanism also includes a side cover assembly, the magnet assembly is arranged in the side cover assembly, and a rotating shaft of the spool passes through the magnet assembly and is placed in the side cover assembly.

In order to solve the above technical problem, another aspect of the present disclosure provides a baitcast reel, which includes a reel main body and the above-mentioned magnetic braking mechanism connected to the fishing reel main body.

In order to solve the above technical problem, yet another aspect of the present disclosure provides a fishing tool, which includes the above-mentioned baitcast reel.

Compared with the prior art, the metal plates in the present disclosure are located between the magnet assembly and the spool, the centrifugal adjusting assembly may automatically adjust the spacing between the metal plates and the axis of the spool according to the rotation speed of the spool when the spool is rotated, that is, the position of the metal plates away from the center is adjusted according to the rotation speed of the spool in order to adjust the range of the magnetic induction lines cut by the metal plates, thereby automatically adjusting magnitude of the braking force.

DESCRIPTION OF THE EMBODIMENTS

Figure 1:
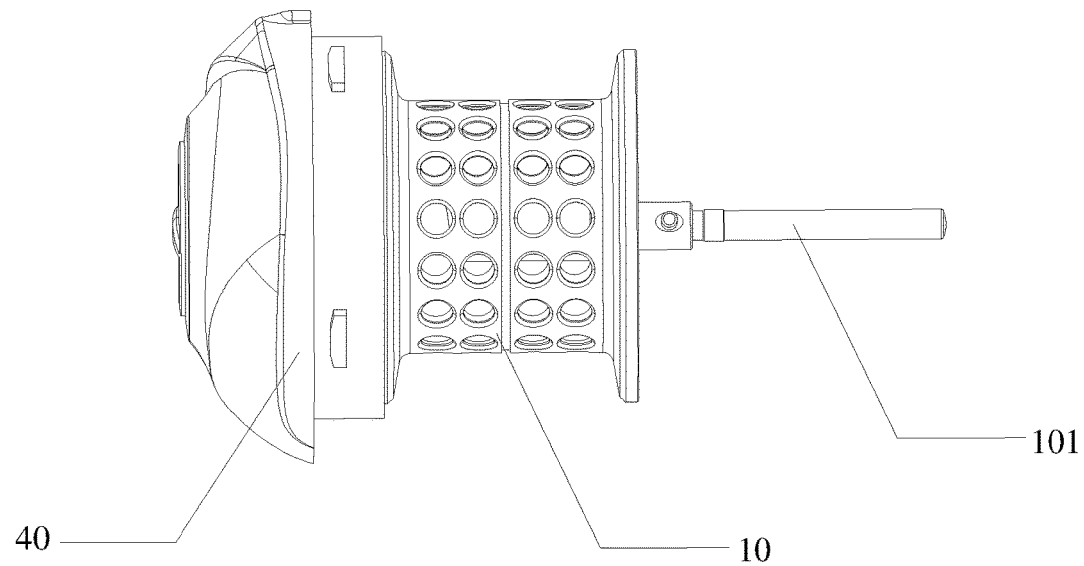
FIG. 1 is a perspective view of a first embodiment of the magnetic braking mechanism of the present disclosure.

The present disclosure will be further described below in conjunction with the accompanying drawings and embodiments in order to enable those of ordinary skill in the art to more clearly understand the objectives, technical proposals, and advantages of the present disclosure.

Referring to FIGS. 1 to 4, FIGS. 1 to 4 show a first embodiment of the magnetic braking mechanism 1 of the present disclosure. In the embodiment shown, the magnetic braking mechanism 1 includes a spool 10, a magnet assembly 20, and a magnetic braking assembly 30. The magnet assembly 20 is arranged on a side of the spool 10 for generating magnetic induction lines. The magnetic braking assembly 30 is connected to the spool 10, and includes at least two metal plates 301 and a centrifugal adjusting assembly 302. The metal plates 301 are disposed between the magnet assembly 20 and the spool 10, and the centrifugal adjusting assembly 302 is used to automatically adjust the spacing between the metal plates 301 and an axis of the spool 10 according to the rotation speed of the spool 10, so as to adjust the range of the magnetic induction lines cut by the metal plates 301, thereby automatically adjusting the braking force. In the magnetic braking mechanism 1 of the present disclosure, the centrifugal adjusting assembly 302 may automatically adjust the spacing between the metal plates 301 and the axis of the spool 10, namely the position of the metal plates 301 away from the center, according to the rotation speed of the spool 10 as the spool 10 rotates, so as to adjust the range of the magnetic induction lines cut by the metal plates 301, thereby automatically adjusting the braking force.

In some embodiments, the magnet assembly 20 includes a magnet base 201 arranged on the side of the spool 10 and a magnetic body 202 consisting of a plurality of magnets 2021. The magnetic body 202 is disposed on the magnet base 201, and magnetic poles on two facing sides of each two adjacent magnets 2021 are opposite. Preferably, in the present embodiment, the magnets 2021 are sector magnets, and the magnetic body 202 is a ring magnet. In some other embodiments, the magnetic body 202 may be a semi-ring magnet or a ¾ ring magnet. In an initial state of the magnetic braking mechanism 1 of the present disclosure, the magnetic induction lines formed by the magnetic body 202 are partially covered by the metal plates 301, thus the braking force is at a minimum. As the rotation speed of the spool 10 increases, the metal plates 301 move away from the axis of the spool 10 in a radial direction under the centrifugal force. Accordingly, a maximum braking force opposite to the rotating direction of the spool 10 is generated by the metal plates 301 cutting the magnetic induction lines when all the magnetic induction lines formed by the magnetic body 202 are covered by the metal plates 301, which may effectively prevent backlashes of the fishing line due to the spool 10 rotating too fast.

Figure 2:
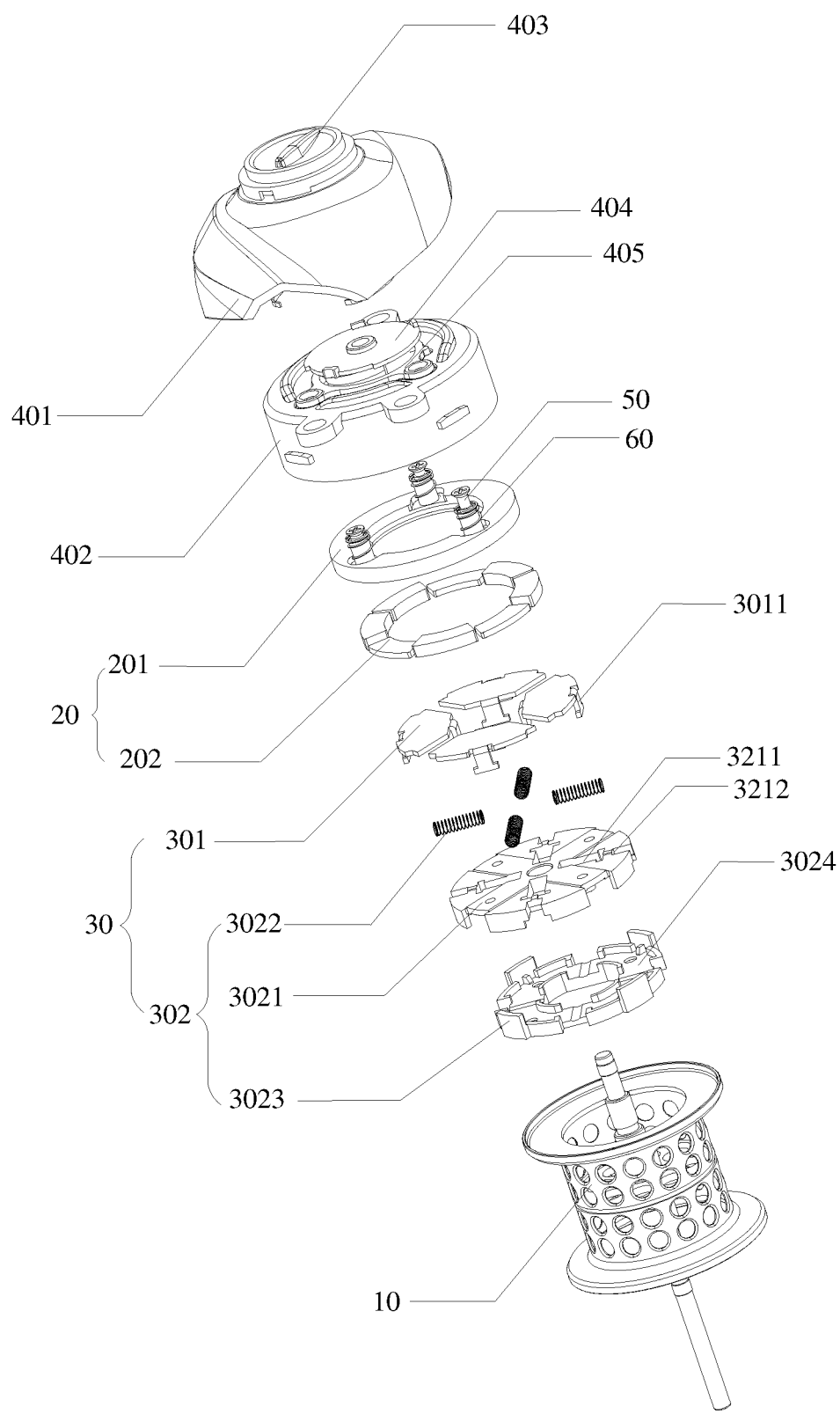
FIG. 2 is an exploded view of the first embodiment of the magnetic braking mechanism of the present disclosure.
Figure 3:
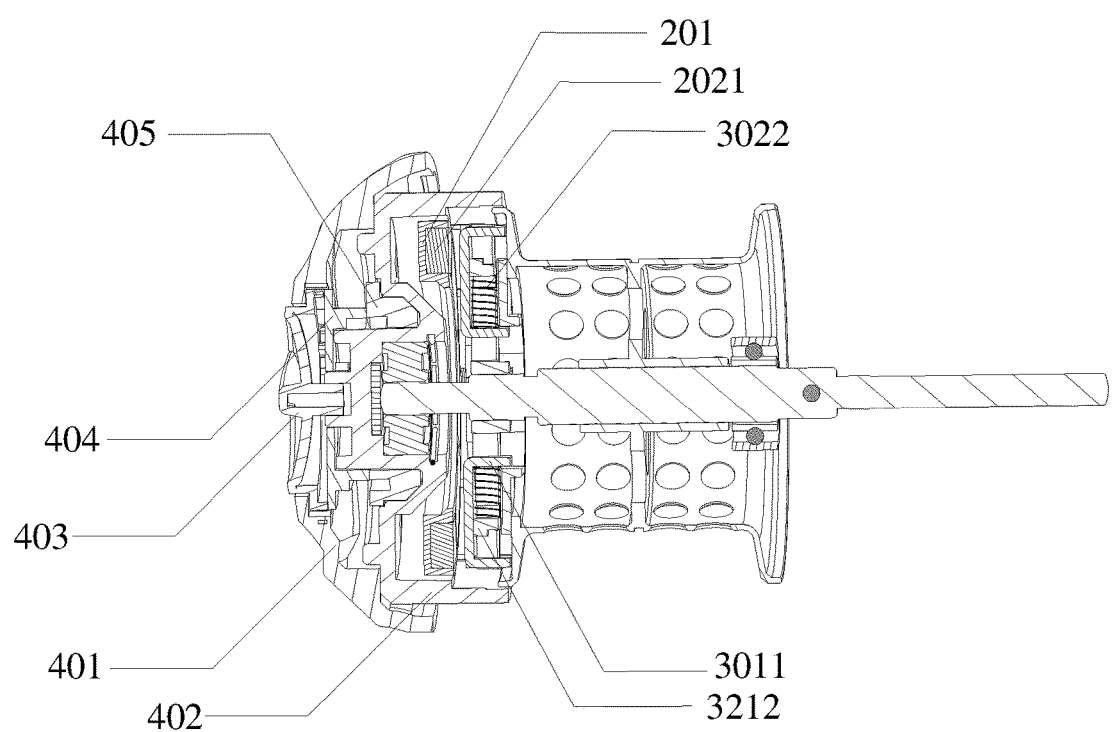
FIG. 3 is a cross-sectional view of the first embodiment of the magnetic braking mechanism of the present disclosure.
Figure 4:
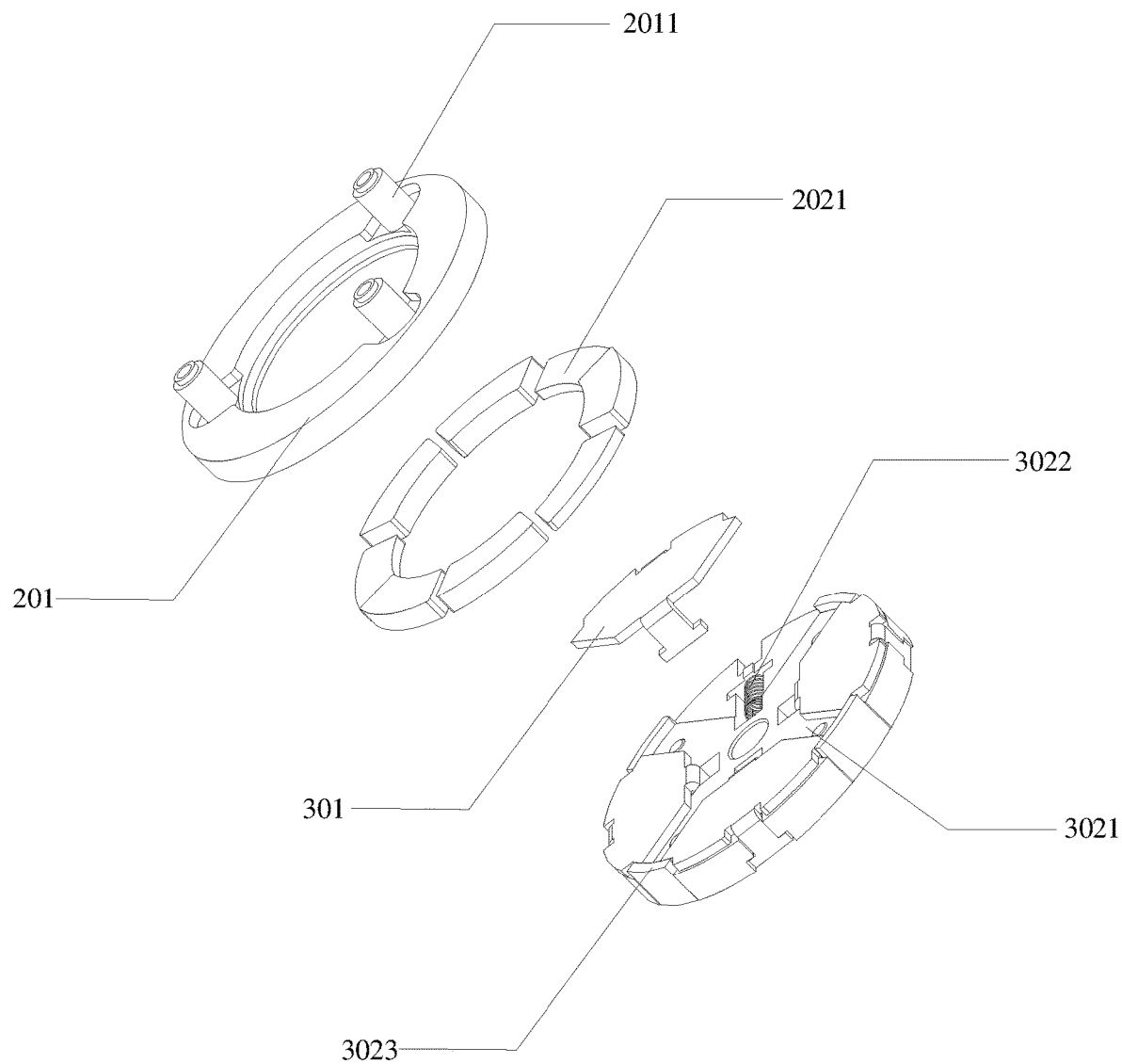
FIG. 4 is an exploded view of the magnet assembly and the magnetic braking mechanism in the first embodiment of the present disclosure.

Referring to FIGS. 2 to 4, in some embodiments, the centrifugal adjusting assembly 302 includes a base body 3021 and at least two elastic pieces 3022. The base body 3021 is connected to the spool 10. Each of the metal plates 301 is movably arranged on the base body 3021 through one of the elastic pieces 3022 respectively, in order to move in a radial direction of the base body 3021 under a centrifugal force or an elastic force of the elastic pieces 3022. Preferably, in the present embodiment, the elastic pieces 3022 are springs. Based on this design, the metal plates 301 move away from the axis of the spool 10 in the radial direction under the centrifugal force when the spool 10 is rotated rapidly, so that the range of the magnetic induction lines cut by the metal plates 301 is increased, and the braking force is increased. Similarly, the metal plates 301 slowly returns to their original positions under the force exerted by the elastic pieces 3022 when the rotation speed of the spool 10 is decreased, so that the range of the magnetic induction lines cut by the metal plates 301 is reduced, and the braking force is decreased.

Specifically, in the present disclosure, the magnetic braking assembly 30 includes four metal plates 301 and four elastic pieces 3022, and the four metal plates 301 and elastic pieces 3022 are arranged on the base body 3021 around the center thereof. Moreover, four sliding slots 3211 are provided on the base body 3021, and a stopper 3212 is provided in a middle part of each of the sliding slots 3211. A sliding block 3011 is extended downward from each of two opposite ends of the metal plate 301, and two sliding blocks 3011 are both disposed in one of the sliding slots 3211 and located respectively on two sides of the stopper 3212. One end of each of the elastic pieces 3022 abuts against the stopper 3212, and the other end abuts against the sliding block 3011 near the axis of the spool 10 to drive the metal plates 301 to move in the radial direction of the base body 3021.

Furthermore, the centrifugal adjusting assembly 302 also includes a limiting block 3023 located between two adjacent metal plates 301, and the limiting block 3023 is arranged at an edge of the base body 3021 to limit a moving distance of the metal plates 301 in the radial direction of the base body 3021. Specifically, in the present embodiment, a limiting base 3024 is located below and connected to the base body 3021. An edge of the limiting base 3024 is extended upward to form four limiting blocks 3023. It should be understood, the limiting blocks 3023 may also be formed directly on an edge of the base body 3021.

Based on the above design, in the magnetic braking mechanism 1 of the present disclosure, the metal plates 301 move outward in the radial direction under the centrifugal force when the spool 10 is rotated rapidly at the beginning of a casting process. The metal plates 301 are stopped by the limiting blocks 3023 when the metal plates 301 move to the edge of the base body 3021 under the centrifugal force. At the same time, all the magnetic induction lines generated between the magnetic body 202 are covered by the metal plates 301, thus a maximum braking force that is opposite to the rotation direction of the spool 10 is generated as the magnetic induction lines are cut by the metal plates 301, which effectively prevents the spool 10 from producing backlashes due to the fast rotation speed. Whereas, at the end of the casting process, the metal plates 301 slowly returns to their original position under the action of the elastic pieces 3022 as the rotation speed of the spool 10 is reduced, so that the area of the magnetic induction lines covered by the metal plates 301 gradually decreases, which reduces the braking force and slows down the decline of the rotation speed of the spool 10, thereby increasing the casting distance.

In some embodiments, the magnetic braking mechanism 1 also includes a side cover assembly 40, the magnet assembly 20 is arranged in the side cover assembly 40, and a rotating shaft 101 of the spool 10 passes through the magnet assembly 20 and is placed in the side cover assembly 40. Specifically, the side cover assembly 40 includes a side cover body 401 and a spool base 402 connected to the side cover body 401, the rotating shaft 101 of the spool 10 passes through the magnet assembly 20 and is inserted in the spool base 402. An adjusting knob 403, a first magnetic slider 404, and a second magnetic slider 405 are disposed in order between the side cover body 401 and the spool base 402, and one end of the adjusting knob 403 is exposed outside the side cover body 401. The second magnetic slider 405 is connected to connecting posts 2011 on the magnet base 201 by screws 50, and each connecting post 2011 is provided with a spring 60.

Figure 5:
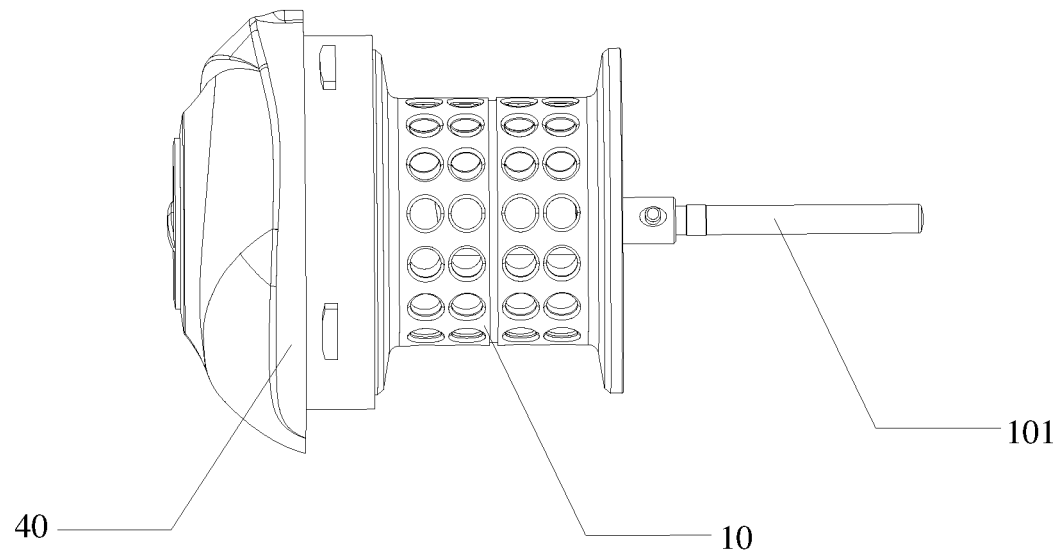
FIG. 5 is a perspective view of a second embodiment of the magnetic braking mechanism of the present disclosure.
Figure 6:
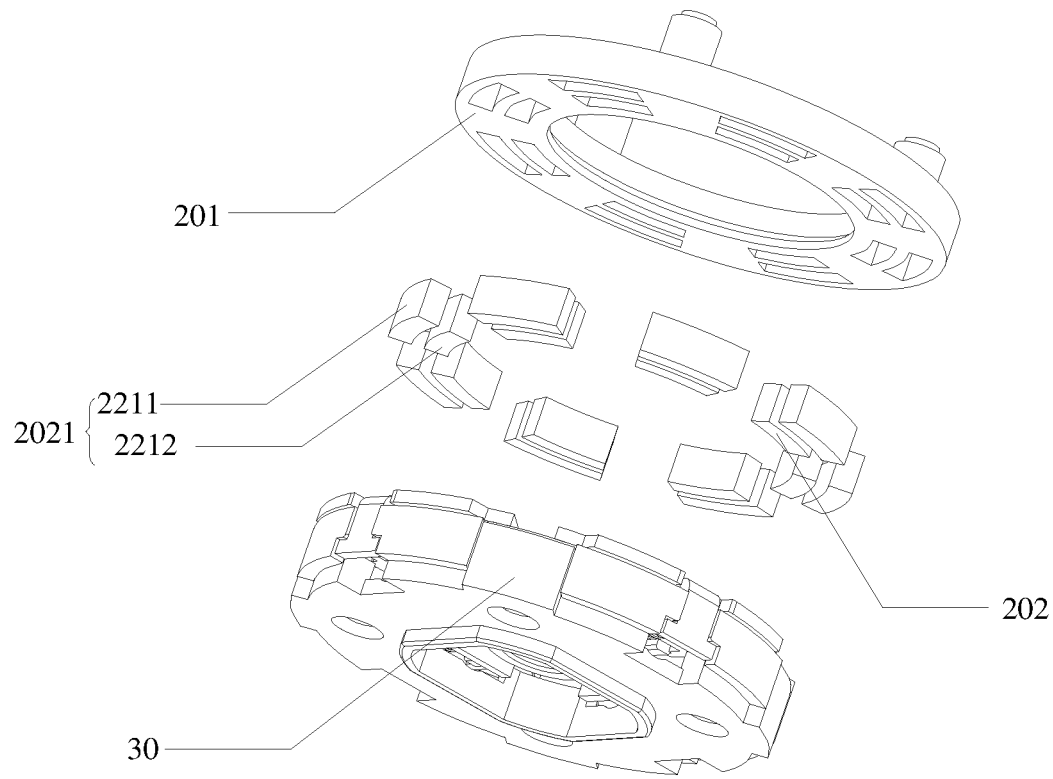
FIG. 6 is an exploded view of the magnet assembly and the magnetic braking mechanism in the second embodiment of the present disclosure.

Referring to FIGS. 5 and 6, FIGS. 5 and 6 show a second embodiment of the magnetic braking mechanism 1 of the present disclosure. The present embodiment is different from the first embodiment in that the specific structure of the magnet assembly 20 is different, and the rest is the same. In the present embodiment, the magnet assembly 20 includes a magnet base 201 disposed on one side of the spool 10 and a magnetic body 202 consisting of a plurality of magnets 2021, and the magnetic body 202 is arranged on the magnet base 201. Each of the magnets 2021 includes a first magnet 2211 and a second magnet 2212 facing each other, and the first magnet 2211 and the second magnet 2212 have opposite magnetic poles. Preferably, in the present embodiment, the magnets 2021 are sector magnets, and the magnetic body 202 is a ring magnet. In some other embodiments, the magnetic body 202 may be a semi-ring magnet or a ¾ ring magnet. It can be understood that in the present embodiment, the magnetic field formed by the magnetic body 202 is different from that in the first embodiment. The range of the magnetic induction lines cut by the metal plates 301 may also be adjusted under the action of the centrifugal adjusting assembly, thereby automatically adjusting the magnitude of the braking force.

It can be understood, in other embodiments of the present disclosure, a baitcast reel may also be provided, which includes a reel main body and the magnetic braking mechanism in the first and second embodiments described above. The spool and the magnetic braking assembly in the magnetic braking mechanism may be assembled in the reel main body, with the side cover assembly connected with the reel main body. At the same time, a fishing tackle including the above-mentioned baitcast reel may also be provided, and the structure of the fishing tackle except for the baitcast reel may be the same as that of conventional fishing tackle in the prior art. For example, a fishing rod, fishing line and the like may be provided, and the structure is well-known to those skilled in the art and will not be repeated herein.

The above descriptions are merely preferred embodiments of the present disclosure, and are not intended to limit the present disclosure. Various equivalent changes and modifications may be made by those skilled in the art on the basis of the above-mentioned embodiments, and all equivalent changes or modifications made within the scope of the claims shall fall within the scope of protection of the present disclosure.

What is claimed is:

1. A magnetic braking mechanism, comprising:
a spool;
a magnet assembly arranged on a side of the spool for generating magnetic induction lines; and
a magnetic braking assembly connected to the spool, and including at least two metal plates and a centrifugal adjusting assembly, the metal plates being disposed between the magnet assembly and the spool, and the centrifugal adjusting assembly being used for automatically adjusting spacing between the metal plates and an axis of the spool according to a rotation speed of the spool, so as to adjust range of the magnetic induction lines cut by the metal plates, thereby automatically adjusting magnitude of a braking force.

2. The magnetic braking mechanism according to claim 1, wherein the magnet assembly comprises a magnet base arranged on the side of the spool and a magnetic body consisting of a plurality of magnets, the magnetic body is disposed on the magnet base, and magnetic poles on two facing sides of each two adjacent magnets are opposite.

3. A baitcast reel, comprising a reel main body and the magnetic braking mechanism according to claim 2, the magnetic braking mechanism being connected to the fishing reel main body.

4. A fishing tool, comprising the baitcast reel according to claim 3.

5. The magnetic braking mechanism according to claim 1, wherein the magnet assembly comprises a magnet base arranged on the side of the spool and a magnetic body consisting of a plurality of magnets, the magnetic body is disposed on the magnet base, each of the magnets includes a first magnet and a second magnet arranged opposite to each other, and the first magnet and the second magnet have opposite magnetic poles.

6. A baitcast reel, comprising a reel main body and the magnetic braking mechanism according to claim 5, the magnetic braking mechanism being connected to the fishing reel main body.

7. A fishing tool, comprising the baitcast reel according to claim 6.

8. The magnetic braking mechanism according to claim 1, wherein the centrifugal adjusting assembly comprises a base body and at least two elastic pieces, the base body is connected to the spool, each of the metal plates is movably arranged on the base body through one of the elastic pieces respectively, in order to move in a radial direction of the base body under a centrifugal force or an elastic force of the elastic pieces.

9. The magnetic braking mechanism according to claim 8, wherein at least two sliding slots are provided on the base body, and a stopper is provided in a middle part of each of the sliding slots, two sliding blocks are extended downward respectively from two opposite ends of each of the metal plates, and the two sliding blocks are both disposed in one of the sliding slots and located respectively on two sides of the stopper, one end of each of the elastic pieces abuts against the stopper, and the other end abuts against one of the sliding blocks that is near the axis of the spool to drive the metal plates to move in the radial direction of the base body.

10. A baitcast reel, comprising a reel main body and the magnetic braking mechanism according to claim 9, the magnetic braking mechanism being connected to the fishing reel main body.

11. A fishing tool, comprising the baitcast reel according to claim 10.

12. The magnetic braking mechanism according to claim 8, wherein a limiting block is located between each two adjacent metal plates, and the limiting block is arranged at an edge of the base body to limit a moving distance of the metal plates in the radial direction of the base body.

13. A baitcast reel, comprising a reel main body and the magnetic braking mechanism according to claim 12, the magnetic braking mechanism being connected to the fishing reel main body.

14. A fishing tool, comprising the baitcast reel according to claim 13.

15. The magnetic braking mechanism according to claim 8, wherein the magnetic braking assembly comprises four metal plates and elastic pieces, and the four metal plates and elastic pieces are arranged on the base body around the center thereof.

16. A baitcast reel, comprising a reel main body and the magnetic braking mechanism according to claim 15, the magnetic braking mechanism being connected to the fishing reel main body.

17. A fishing tool, comprising the baitcast reel according to claim 16.

18. A baitcast reel, comprising a reel main body and the magnetic braking mechanism according to claim 8, the magnetic braking mechanism being connected to the fishing reel main body.

19. A fishing tool, comprising the baitcast reel according to claim 18.

20. The magnetic braking mechanism according to claim 1, wherein the magnetic braking mechanism further comprises a side cover assembly, the magnet assembly is arranged in the side cover assembly, and a rotating shaft of the spool passes through the magnet assembly and is placed in the side cover assembly.

21. A baitcast reel, comprising a reel main body and the magnetic braking mechanism according to claim 20, the magnetic braking mechanism being connected to the fishing reel main body.

22. A fishing tool, comprising the baitcast reel according to claim 21.

23. A baitcast reel, comprising a reel main body and the magnetic braking mechanism according to claim 1, the magnetic braking mechanism being connected to the fishing reel main body.

24. A fishing tool, comprising the baitcast reel according to claim 23.

* * * * *